United States Patent
Thomas (10) Patent No.: US 8,027,683 B2
(45) Date of Patent: Sep. 27, 2011

(54) HANDOVER BETWEEN RADIO NETWORKS

(75) Inventor: Howard J. Thomas, Cirencester (GB)

(73) Assignee: Motorola Solutions, Inc., Schaumburg, IL (US)

( * ) Notice: Subject to any disclaimer, the term of this patent is extended or adjusted under 35 U.S.C. 154(b) by 381 days.

(21) Appl. No.: 12/297,083

(22) PCT Filed: Mar. 27, 2007

(86) PCT No.: PCT/US2007/065076
§ 371 (c)(1),
(2), (4) Date: Oct. 14, 2008

(87) PCT Pub. No.: WO2007/124229
PCT Pub. Date: Nov. 1, 2007

(65) Prior Publication Data
US 2009/0117906 A1 May 7, 2009

(30) Foreign Application Priority Data
Apr. 21, 2006 (GB) .................................. 0607883.6

(51) Int. Cl.
*H04W 36/00* (2009.01)
*H04W 4/00* (2009.01)
(52) U.S. Cl. ...................................... 455/437; 370/331
(58) Field of Classification Search .................. 455/436, 455/437, 438, 443, 444, 447, 525; 370/59, 370/318, 329, 331, 332, 333
See application file for complete search history.

(56) References Cited

U.S. PATENT DOCUMENTS

| 6,178,882 | B1 | | 1/2001 | Wagner et al. |
| 6,424,638 | B1 | * | 7/2002 | Ray et al. ....................... 370/331 |
| 6,507,740 | B2 | | 1/2003 | Shi |
| 6,567,670 | B1 | * | 5/2003 | Petersson ....................... 455/522 |
| 6,771,964 | B1 | * | 8/2004 | Lahtinen et al. ............... 455/437 |
| 6,822,948 | B2 | * | 11/2004 | Bergstrom et al. ........... 370/332 |

(Continued)

FOREIGN PATENT DOCUMENTS
GB          2352586 A        1/2001
(Continued)

OTHER PUBLICATIONS
Korean Office Action Dated Aug. 26, 2010.

*Primary Examiner* — Kamran Afshar
*Assistant Examiner* — Gerald Oliver
(74) *Attorney, Agent, or Firm* — Brian M. Mancini; Terri S. Hughes; Daniel R. Bestor (57) ABSTRACT

A communication system comprises a first radio network supporting a first air interface standard and a second radio network supporting a second air interface standard. The second radio network comprises a network interface 401 which receives a handover request message from the first radio network to hand over a remote station 101 to the second network. A handover preference processor 405 receives a handover preference message including a preference indication for a radio network for the remote station. A load processor 409 determines a load indication for the second radio network and a load threshold processor 407 determines a handover load threshold for the remote station in response to the preference indication. A handover evaluation processor 403 determines whether to accept the handover in response to a comparison of the load indication and the handover load threshold.

14 Claims, 4 Drawing Sheets

U.S. PATENT DOCUMENTS

| | | | |
|---|---|---|---|
| 6,973,311 B2 * | 12/2005 | Yi-Bing et al. | 455/436 |
| 6,993,332 B2 * | 1/2006 | Pedersen et al. | 455/436 |
| 7,016,320 B1 * | 3/2006 | Petersson et al. | 370/331 |
| 7,039,409 B2 * | 5/2006 | Lobinger et al. | 455/443 |
| 7,089,008 B1 * | 8/2006 | Back et al. | 455/437 |
| 7,146,175 B2 * | 12/2006 | Rune et al. | 455/453 |
| 7,346,027 B2 * | 3/2008 | Bossoli et al. | 370/328 |
| 7,567,808 B2 * | 7/2009 | Yeh | 455/436 |
| 7,620,015 B2 * | 11/2009 | Lenzarini | 370/331 |
| 7,660,585 B2 * | 2/2010 | Back et al. | 455/437 |
| 7,706,797 B2 * | 4/2010 | Henttonen et al. | 455/436 |
| 7,805,139 B2 * | 9/2010 | Shaheen et al. | 455/434 |
| 7,805,142 B2 * | 9/2010 | Calin et al. | 455/437 |
| 2002/0019231 A1 * | 2/2002 | Palenius et al. | 455/437 |
| 2003/0207688 A1 | 11/2003 | Nikkelen | |
| 2004/0266436 A1 * | 12/2004 | Jaakkola et al. | 455/436 |
| 2005/0143071 A1 * | 6/2005 | Jaakkola et al. | 455/436 |
| 2007/0004412 A1 * | 1/2007 | Henttonen et al. | 455/436 |
| 2007/0218903 A1 * | 9/2007 | Grech | 455/436 |
| 2009/0156215 A1 * | 6/2009 | Pitkamaki | 455/437 |

FOREIGN PATENT DOCUMENTS

| | | |
|---|---|---|
| KR | 20020043591 | 6/2002 |
| WO | WO0122764 A1 | 3/2001 |
| WO | 02089514 A1 | 11/2002 |

* cited by examiner

HANDOVER BETWEEN RADIO NETWORKS

FIELD OF THE INVENTION

The invention relates to handovers between radio networks and in particular, but not exclusively, to handovers between Global System for Mobile communication (GSM) and Universal Mobile Telecommunication System (UMTS) radio networks.

BACKGROUND OF THE INVENTION

Currently, the most ubiquitous cellular communication system is the 2nd generation communication system known as the Global System for Mobile communication (GSM). Further description of the GSM TDMA communication system can be found in 'The GSM System for Mobile Communications' by Michel Mouly and Marie Bernadette Pautet, Bay Foreign Language Books, 1992, ISBN 2950719007.

3rd generation systems have recently been rolled out in many areas to further enhance the communication services provided to mobile users. One such system is the Universal Mobile Telecommunication System (UMTS), which is currently being deployed. Further description of CDMA and specifically of the Wideband CDMA (WCDMA) mode of UMTS can be found in 'WCDMA for UMTS', Harri Holma (editor), Antti Toskala (Editor), Wiley & Sons, 2001, ISBN 0471486876. The core network of UMTS is built on the use of SGSNs, GGSNs and MSCs thereby providing commonality with GPRS and GSM.

As a mobile station moves, it may move from the coverage of one base station to the coverage of another, i.e. from one cell to another. As the mobile station moves towards a base station, it enters a region of overlapping coverage of two base stations and within this overlap region it changes to be supported by the new base station. As the mobile station moves further into the new cell, it continues to be supported by the new base station. This is known as a handover or handoff of a mobile station between cells.

As an increasing number of communication systems, such as GSM, UMTS, Wireless Local Area Network (WLAN etc), are introduced mobile stations are being deployed which are capable of accessing different communication systems. Indeed, the variety of systems has led to a design philosophy where interworking between different communication systems and air interface standards has become a priority. Indeed, the different radio access standards and technologies are often viewed as different radio access networks of a combined hybrid communication system having a common or interfaced core network. These different radio access networks or air interface standards are often referred to as different access layers.

In order to achieve efficient interworking between different radio access technologies, handover of communication services between these has become increasingly important. For example, a mobile station may comprise both GSM and UMTS functionality and may handover an ongoing call from a GSM RAN to a UMTS RAN or vice versa. Such interlayer handover may provide enhanced communication services and an improved user experience. However, the interlayer handover requires complex management procedures. Also, the different RANs have different characteristics and the characteristics of the service provided to the mobile station are typically dependent on the RAN currently supporting the service.

Thus, in mobile communications systems, different access layers may have different capabilities and may support some services better than others. To deal with this issue, the $3^{rd}$ Generation Partnership Project (3GPP) Technical Specifications provide for a Service Handover mechanism between GSM and UMTS. The handover mechanism seeks to define an access layer preference for a communication service such that for a given service it is defined which access layer the service is preferably supported by. Hence, the service is supported by the preferred access layer if this is possible and the alternative layer is mainly used if the preferred layer cannot support the service.

Specifically, for GSM and UMTS, handovers are managed within the serving RAN based on the conditions of the individual mobile station. However, the service itself is set up and controlled by the core network and the RAN has only information of the characteristics of the radio bearers supporting the service but not of the characteristics of the service itself. Accordingly, 3GPP have introduced an access layer preference in the Handover Service Information Element which is an information element communicated from the Core Network to the RAN. For a GSM RAN, the access layer preference has the following states for a given service:

Unset—no preference is indicated.
   There is no preference for the service for any access layer.
Should handover to UMTS.
   If possible the service should be handed over to the UMTS access layer. The GSM RAN hands the service over to UMTS if the radio conditions allow this.
Should not handover to UMTS
   If possible the service should be continued to be supported by the GSM RAN. The service is only handed over to UMTS if the radio conditions require this to continue to support the service.
Shall not handover to UMTS.
   The service must be supported by the GSM RAN or dropped. The service cannot be handed over to UMTS.

The Handover Service Information Element sent from the core network to the UMTS RAN comprises the following settings:

Unset—no preference is indicated.
   There is no preference for the service for any access layer.
Should handover to GSM.
   If possible the service should be handed over to the GSM access layer. The UMTS RAN hands the service over to GSM if the radio conditions allow this.
Should not handover to GSM
   If possible the service should be continued to be supported by the UMTS RAN. The service is only handed over to GSM if the radio conditions require this to continue to support the service.
Shall not handover to GSM.
   The service must be supported by the UMTS RAN or dropped. The service cannot be handed over to GSM.

In a cellular communication system it is important to ensure that communications are reliable supported with acceptable Quality of Service (QoS) levels. For this reason, handovers are typically not allow into cells which are highly loaded as this may cause unacceptable degradation to existing communications. In such cases, handovers that are imperative may still accepted but all other handovers will be rejected. However, in multi RAN systems, such an approach may cause suboptimal performance. For example, it may frequently lead to services that are best supported by one RAN, say UMTS, not being handed over from another RAN, say GSM, even if the service could potentially be supported by the first RAN. This may result in reduced QoS for the service as it will continue to be restricted by the characteristics of the less preferred RAN (GSM).

Hence, an improved handover would be advantageous in many scenarios.

SUMMARY OF THE INVENTION

Accordingly, the Invention seeks to preferably mitigate, alleviate or eliminate one or more of the above mentioned disadvantages singly or in any combination.

According to a first aspect of the invention there is provided a communication system comprising: a first radio network supporting a first air interface standard and a second radio network supporting a second air interface standard; wherein the first radio network comprises: means for determining that a handover attempt to the second radio network should be attempted for a first remote station supported by the first radio network, transmitting means for transmitting a handover request message for the first remote station to the second radio network; and the second radio network comprises: means for receiving the handover request message, means for receiving a handover preference message for the first remote station, the handover preference message comprising a preference indication for a radio network, means for determining a load indication for the second radio network, threshold means for determining a handover load threshold for the first remote station in response to the preference indication, and means for determining whether to accept a handover of the first remote station in response to a comparison of the load indication and the handover load threshold.

The invention may allow improved performance in a cellular communication system and may in particular allow a more flexible handover performance. The invention may allow improved quality of service to be experienced by many communication services and/or may allow communication services to increasingly be supported by the radio network most suitable for them. In addition, the invention may allow a reliable handover operation with reduced probability of handovers degrading existing services supported by the second radio network.

The core network may comprise a single network or may be a hybrid network comprising a plurality of networks such as a UMTS Core Network and the Internet.

The handover of the remote station may be fully or partly. For example, the handover determination may relate to all services and radio bearers supported for the remote station or may relate to only one or some of the services or radio bearers supported for the remote station.

According to an optional feature of the invention, the preference indication comprises an indication of a preferred air interface standard.

This may allow improved performance and/or may facilitate implementation. The preference indication may be a direct indication or may be an indirect indication such as an indication of the preferred radio network.

According to an optional feature of the invention, the threshold means is arranged to increase the handover load threshold in response to the preference indication being indicative of a preference for the second network.

This may allow improved performance and/or may facilitate implementation. In particular it may allow communication services to increasingly be supported by the radio network most suitable for the communication service and may allow improved quality of service for the communication service.

According to an optional feature of the invention, the threshold means is arranged to reduce the handover load threshold in response to the preference indication being indicative of a preference for the first network.

This may allow improved performance and/or may facilitate implementation. In particular it may allow communication services to increasingly be supported by the radio network most suitable for the specific communication service while allowing the degradation on existing communications to be reduced.

According to an optional feature of the invention, the threshold means is arranged to reduce the handover load threshold in response to the preference indication not being indicative of a preference for the first network or the second network.

This may allow improved performance and/or may facilitate implementation. In particular, it may allow communication services to increasingly be supported by the radio network most suitable for the communication service while allowing the degradation on existing communications to be reduced.

According to an optional feature of the invention, the load indication comprises a measure of a loading of a handover target cell of the second radio network for the handover attempt.

This may allow improved performance.

According to an optional feature of the invention, the threshold means is further arranged to determine the handover load threshold in response to subscription data for a user of the first remote station.

This may allow improved performance and may in particular allow a more flexible handover operation which can be effectively adapted to the characteristics and requirements of the individual communication service and user.

According to an optional feature of the invention, the first radio network comprises means for setting the handover preference indication.

This may allow improved performance and/or may facilitate implementation.

According to an optional feature of the invention, the cellular communication system further comprises a core network for routing data to and from radio networks and the transmitting means is arranged to transmit the handover request message to the second radio network via the core network.

This may allow improved performance and/or may facilitate implementation. In particular, it may allow improved compatibility with requirements and characteristics of existing communications systems.

According to an optional feature of the invention, the core network comprises means for setting the handover preference indication.

This may allow improved performance and/or may facilitate implementation.

According to an optional feature of the invention, the core network comprises a cellular communication system core network.

The invention may allow improved performance and/or facilitate operation and/or implementation for communication systems including a cellular communication system core network such as a UMTS core network.

According to an optional feature of the invention, the first radio network is a Radio Access Network selected from the group of: a second generation cellular communication system Radio Access Network; a third generation cellular communication system Radio Access Network; a Wireless Local Area Network; a GSM Radio Access Network; and a UMTS Radio Access Network.

The invention may allow improved performance and/or facilitate operation and/or implementation for communication systems comprising the above referenced Radio Access Networks.

According to an optional feature of the invention, the second radio network is a different Radio Access Network than the first radio network and is selected from the group of: a second generation cellular communication system Radio Access Network; a third generation cellular communication system Radio Access Network; a Wireless Local Area Network; a GSM Radio Access Network; and a UMTS Radio Access Network.

The invention may allow improved performance and/or facilitate operation and/or implementation for communication systems comprising two of the above referenced Radio Access Networks.

According to an optional feature of the invention, the threshold means is arranged to set the handover load threshold to a predetermined value if no handover preference message is received for the first remote station.

This may improve performance and/or facilitate operation and/or implementation. In particular, it may provide improved performance for services not having an explicit handover preference.

According to an optional feature of the invention, possible values of the preference indication comprise at least one value selected from the group of: a handover preference for the second radio network; a handover preference for the first radio network; and an indication that handover to the second radio network is not allowed.

This may improve performance and/or facilitate operation and/or implementation.

According to an optional feature of the invention, the handover preference message comprises a $3^{rd}$ Generation Partnership Project, 3GPP, Service Handover Information Element.

This may improve performance and/or facilitate operation and/or implementation. In particular, the invention may provide improved performance in a 3GPP cellular communication system and/or may provide enhanced compatibility with such systems.

The Service Handover Information Element may be comprised in the Assignment Command, UTRAN Cell Change Order or Handover Command (for $2^{nd}$ Generation systems) or the RAB Assignment Command or Relocation Request Message (for $3^{rd}$ Generation system).

According to another aspect of the invention, there is provided a radio network for a communication system comprising: means for receiving a handover request message from another radio network supporting a different air interface standard than the radio network, the handover request message comprising a request to handover a first remote station to the radio network; means for receiving a handover preference message for the first remote station, the handover preference message comprising a preference indication for a radio network; means for determining a load indication for the radio network; threshold means for determining a handover load threshold for the first remote station in response to the preference indication; and means for determining whether to accept a handover of the first remote station in response to a comparison of the load indication and the handover load threshold.

According to another aspect of the invention, there is provided a method of operation in a communication system including a first radio network supporting a first air interface standard and a second radio network supporting a second air interface standard; the method comprising: the first radio network performing the steps of: determining that a handover attempt to the second radio network should be attempted for a first remote station supported by the first radio network, and transmitting a handover request message for the first remote station to the second radio network; and the second radio network performing the steps of: receiving the handover request message, receiving a handover preference message for the first remote station, the handover preference message comprising a preference indication for a radio network, determining a load indication for the second radio network; determining a handover load threshold for the first remote station in response to the preference indication, and determining whether to accept a handover of the first remote station in response to a comparison of the load indication and the handover load threshold.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a communication system having a Core Network (CN) interconnecting a GSM and a UMTS Radio Access Network. However, it will be appreciated that the invention is not limited to this application but may be applied to many other communication systems and other radio networks including peer-to-peer communication systems not comprising a core network.

Figure 1:
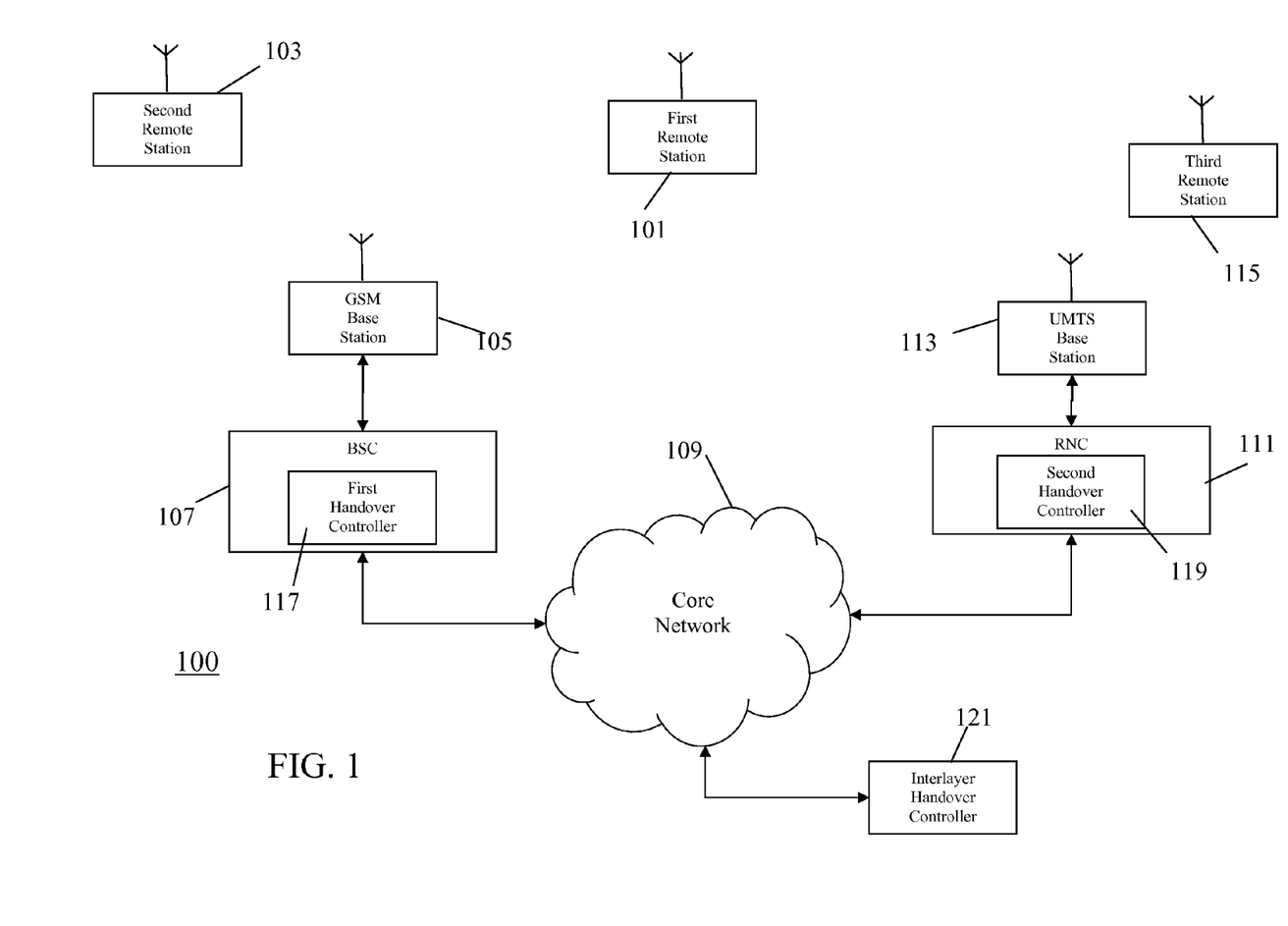
FIG. 1 illustrates an example of a communication system in accordance with some embodiments of the invention.

FIG. 1 illustrates an example of a cellular communication system 100 in accordance with some embodiments of the invention.

In a cellular communication system, a geographical region is divided into a number of cells each of which is served by a base station. The base stations are interconnected by a fixed network which can communicate data between the base stations. A remote station (e.g. a User Equipment (UE) or a mobile station) is served via a radio communication link by the base station of the cell within which the remote station is situated.

As a remote station moves, it may move from the coverage of one base station to the coverage of another, i.e. from one cell to another. As the remote station moves towards a base station, it enters a region of overlapping coverage of two base stations and within this overlap region it changes to be supported by the new base station. As the remote station moves further into the new cell, it continues to be supported by the new base station. This is known as a handover or handoff of a remote station between cells.

A typical cellular communication system extends coverage over typically an entire country and comprises hundreds or even thousands of cells supporting thousands or even millions of remote stations. Communication from a remote station to a base station is known as uplink, and communication from a base station to a remote station is known as downlink.

In the example of FIG. 1, a first remote station 101 and a second remote station 103 are in a first cell supported by a first base station 105. The first base station 105 is specifically a GSM base station which is part of a GSM RAN.

The first base station 105 is coupled to a Base Station Controller (BSC) BSC 107 which is also part of the GSM RAN. A BSC performs many of the control functions related to the air interface including radio resource management and routing of data to and from appropriate base stations.

The BSC 107 is coupled to a Core Network (CN) 109. A CN interconnects different RANs and can interconnect different sections of a RAN such as different GSM BSCs. The CN 109 is operable to route data between any two RANs, thereby enabling a remote station in one RAN to communicate with a remote station in another RAN. In addition, a core network comprises gateway functions for interconnecting to other networks such as the Public Switched Telephone Network (PSTN), thereby allowing remote stations to communicate with landline telephones and other communication terminals connected by a landline. Furthermore, the CN comprises much of the functionality required for managing a conventional cellular communication network including functionality for routing data, admission control, resource allocation, subscriber billing, remote station authentication etc.

In FIG. 1, the core network 109 is further coupled to a UMTS Radio Network Controller (RNC) 111 which is part of a GSM RAN. An RNC performs many of the control functions related to the air interface including radio resource management and routing of data to and from appropriate base stations. The RNC 111 is coupled to a UMTS base station 113 (a Node B). The UMTS base station 113 supports a third remote station 115.

Thus, the communication system of FIG. 1 supports a plurality of different air interface technologies and standards through different radio networks (a radio network may e.g. be considered to comprise a RAN and the remote stations operating or capable of operating with the RAN). The different radio networks supporting different air interface standards are often referred to as different access layers of the communication system.

In a hybrid communication system, such as the communication system of FIG. 1, it is advantageous that remote stations can handover not only within a given air interface technology or radio network but also between different air interface technologies and radio networks. For example, most UMTS remote stations also comprise functionality for communicating using the GSM air interface standard. Indeed, UMTS is initially deployed to provide islands of coverage with the wider coverage being supported by GSM.

In FIG. 1, the first remote station 101 comprises both functionality for communicating over a GSM air interface and functionality for communicating over a UMTS air interface. Thus, the first remote station can be supported both by the UMTS RAN and the GSM RAN.

The communication system of FIG. 1 comprises functionality that allows a service of the first remote station 101 to be handed over from the GSM RAN to the UMTS RAN and vice versa. The following description will illustrate the principles in terms of a handover from GSM to UMTS but it will be appreciated that the described principles apply equally well to handover from UMTS to GSM.

Interlayer handover is in a hybrid GSM and UMTS communication system controlled within the network element controlling the base stations (i.e. the RNC or BSC). Specifically, the RNCs and BSCs receive measurement reports from the remote stations supported by the network element. The measurement reports include signal quality measurements relating to both neighbouring base stations in the same access layer as well as base stations in the other access layers. The RNC/BSC currently supporting the remote station evaluates these measurement reports and decides if a handover to another base station of the same or a different access layer should be performed. This determination is performed by the individual network element without information from or interaction with the other radio network.

In the specific example of FIG. 1, the BSC 107 comprises a first handover controller 117 and the RNC 111 comprises a second handover controller 119. The first handover controller 117 receives measurement reports from all the remote stations that are supported by GSM base stations 105 controlled by the BSC 107. In response, the first handover controller 117 determines if a handover should be performed for the individual remote station. Similarly, the second handover controller 119 receives measurement reports from all the remote stations which are supported by UMTS base stations 113 controlled by the RNC 111. In response, the second handover controller 119 determines if a handover should be performed for the individual remote station.

Figure 2:
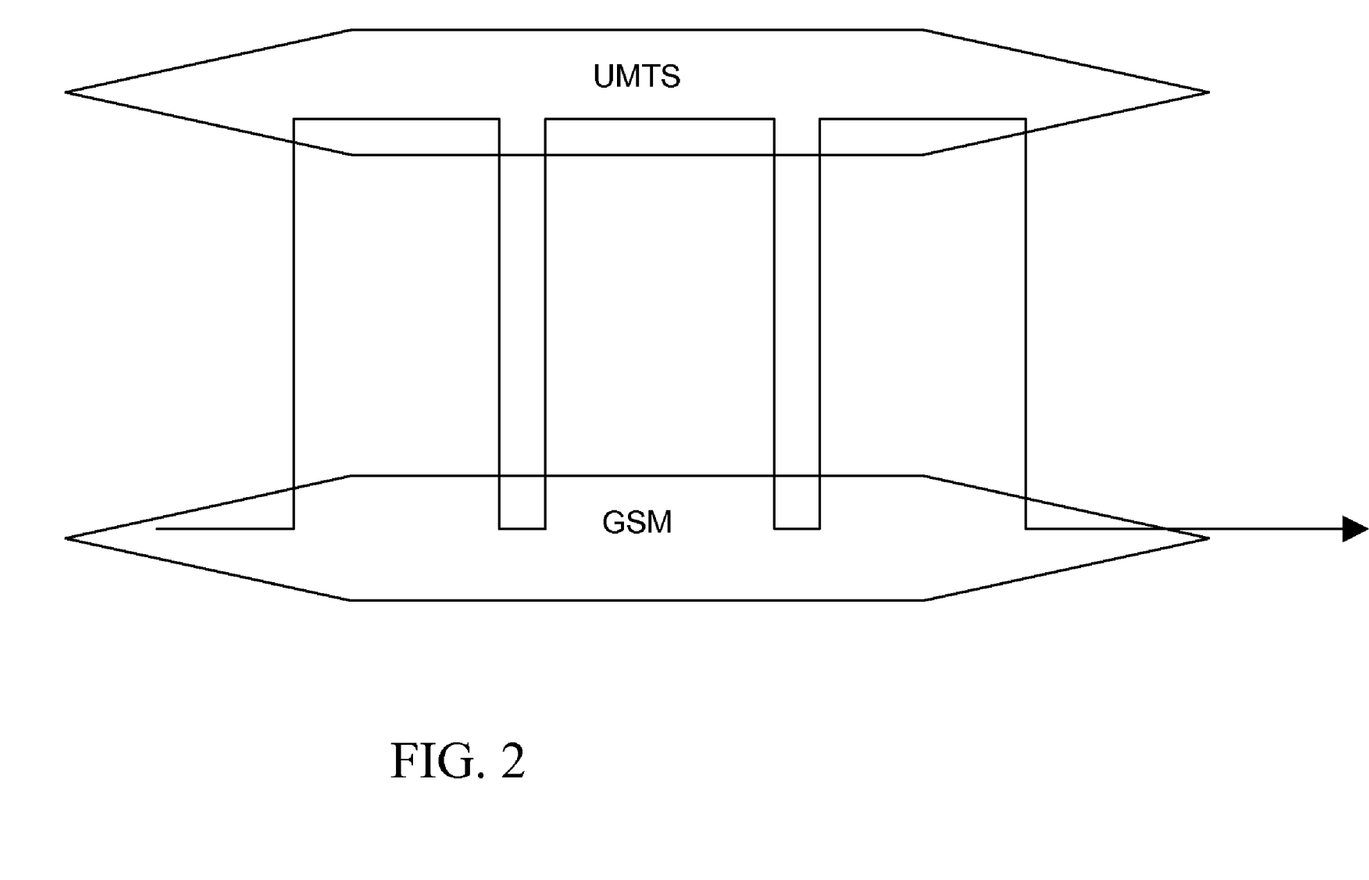
FIG. 2 illustrates an example of a handover sequence between a UMTS and GSM radio network.

The first handover controller 117 can specifically determine if a handover from the GSM RAN to the UMTS RAN should be performed and the second handover controller 119 can specifically determine if a handover from the UMTS RAN to the GSM RAN should be performed. Thus, in such systems, a remote station may handover between the different RANs depending on the experienced conditions as illustrated in FIG. 2.

Some services may be better supported in one access layer than in another access layer. For example, UMTS may provide a higher throughput data rate than GSM and some video services may e.g. provide a higher video quality by exploiting the higher data rate for a UMTS RAN.

Accordingly, the UMTS and GSM systems allow a specific access layer to be selected as a preferred access layer for a given service of a remote station. For example, when a video service is set up, a preference for UMTS may be registered. This preference is then communicated to the handover controller currently supporting the remote station by a Service Handover Information Element which is communicated from the CN 109 to the handover controller. Thus, the RAN originating a handover may additionally consider a RAN preference for the communication service and may use this to determine if a handover attempt should be initiated.

Thus, if the preference is for the UMTS access layer, the second handover controller 119 will not perform a handover to the GSM RAN unless this is necessary in order to support the service. However, if the remote station is supported by the GSM radio network, the first handover controller 117 will seek to handover the remote station to the UMTS RAN if this is possible.

Thus, this approach may be used to bias the remote station towards the desired RAN. However, it may not always be possible to handover the remote station to the desired RAN. Specifically, cellular communication systems typically include a load consideration when performing handovers. Conventionally, a handover is only permitted if the target cell of the target RAN has a loading below a given threshold. If the current loading is above this threshold, incoming handover requests are rejected unless these are imperative in order to continue to support the communication. Consequently, when the loading approaches saturation, communication services that are best served by a given RAN are often rejected although it would be possible to accommodate these. This results in a reduced user experience and reduced quality of service for the communication services.

In the system of FIG. 1, the handover controllers 117, 119 are arranged to modify their load criterion for accepting an incoming handover in response to a RAN preference for the communication service of the remote station. Accordingly, an improved handover performance, quality of service and user experience can be achieved. In contrast to conventional services where the handover preference (or access layer preference) is only considered when determining if a handover attempt should be initiated (i.e. in the RAN currently serving the remote station), the system of FIG. 1 furthermore allows the preference to be taken into account by the target RAN when determining whether to accept or reject the incoming handover request. Specifically, the system modifies the load threshold for accepting incoming handovers in response to the RAN preference of the communication service being handed over.

Figure 3:
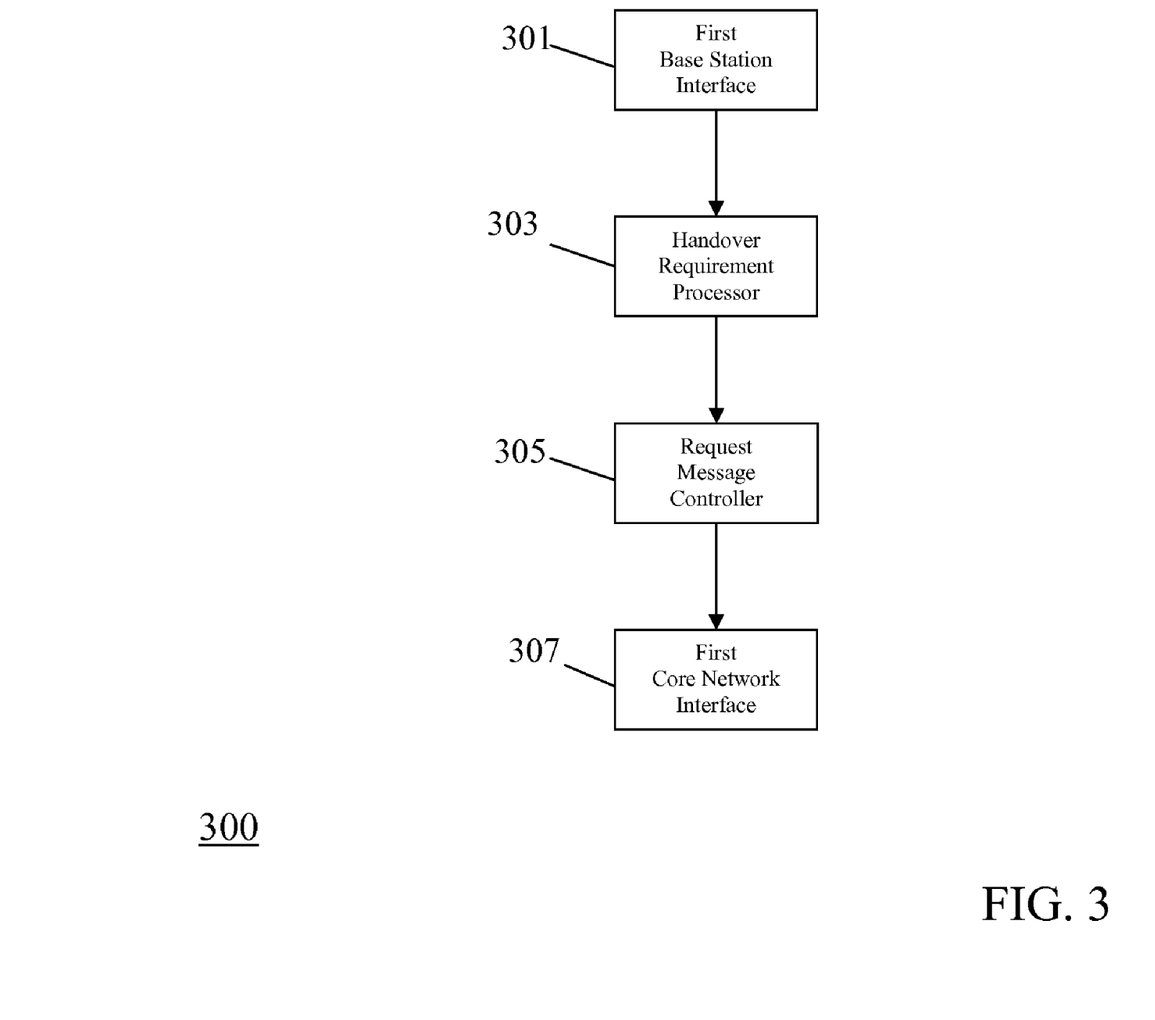
FIG. 3 illustrates an example of elements of a Base Station Controller in accordance with some embodiments of the invention.

FIG. 3 illustrates an example of elements of the BSC 107. The BSC 107 comprises as a first base station interface 301 which is arranged to communicate with the base stations 105 served by the BSC 107. In particular, the first base station interface 301 can receive measurement reports and other data from the remote stations 101, 103.

The first base station interface 301 is coupled to a handover requirement processor 303 which is operable to determine if any of the remote stations 101, 103 should be handed over. In the specific example, the handover requirement processor 303 can evaluate the current conditions experienced by the first remote station 101 and can determine if these conditions are such that it will be beneficial to handover the remote station 101 to the UMTS RAN.

In the example, the handover requirement processor 303 performs this evaluation not only based on the conditions experienced by the first remote station 101 but also based on a RAN preference for the first remote station 101.

In the example, this preference is received from the core network. In particular, the communication system of FIG. 1 comprises an interlayer handover controller 121 which is arranged to communicate with the first handover controller 117 and the second handover controller. The interlayer handover controller 121 is specifically arranged to transmit a handover preference message to the first and second handover controllers 117, 119. The handover preference message can specifically be a Service Handover Information Element. The Service Handover Information Element can for example be transported in different messages defined by the UMTS and the GSM specifications. Specifically, the Service Handover Information Element can be sent to the first handover controller 117 by including it in the Assignment Command, UTRAN Cell Change Order or Handover Command as defined in GSM Recommendations 48.008 and 48.018. The Service Handover Information Element can be sent to the second handover controller 119 by including it in the RAB Assignment Command or Relocation Request Message defined in UMTS Technical Specification TS 25.413.

The interlayer handover controller 121 is arranged to set a handover preference indication of the Service Handover Information Element. The preference indication can be set to indicate a preference for a specific access layer/radio network/air interface standard.

Specifically, in accordance with the specifications for UMTS and GSM, the Service Handover Information Element can comprise a three bit handover preference indication which conventionally can comprise the following possible settings when sent to a GSM RAN:
  000 Prefer UMTS (the second handover controller 119 will hand the service over to UMTS if possible).
  001 Should not handover to UMTS (the second handover controller 119 will only hand the service over to UMTS if necessary).
  010 Shall not handover to UMTS (the second handover controller 119 will not hand the service over to UMTS).

Similarly, when sent to a UMTS RAN, the Service Handover Information Element can comprise a three bit handover preference indication with the following possible settings
  000 Prefer GSM (the first handover controller 117 will hand the service over to GSM if possible).
  001 Should not handover to GSM (the first handover controller 117 will only hand the service over to GSM if necessary).
  010 Shall not handover to GSM (the first handover controller 117 will not hand the service over to GSM).

Although the message is defined as a three bit message, only two bits are currently used and the leading bit is always set to "0". However, it will be appreciated that the described approach is not limited to this specific case.

Thus, the handover requirement processor 303 of the first handover controller 117 is arranged to perform the handover determination in response to the handover preference indication of the Service Handover Information Element. For example, if the first remote station 101 has a preference for GSM, a handover attempt will only be initiated if the quality of service drops to a low level whereas if the first remote station 101 has a preference for UMTS a handover attempt will be initiated even if the quality of service is at a higher level.

The handover requirement processor 303 is coupled to a request message controller 305. If the handover requirement processor 303 determines that a handover attempt to the UMTS RAN should be initiated it informs the request message controller 305 which proceeds to generate a handover request message for the UMTS RAN.

The request message controller 305 is coupled to a first core network interface 307. The request message controller 305 can transmit the handover request message to the UMTS RAN, and in the specific example to the UMTS RNC 111, via the core network.

Figure 4:
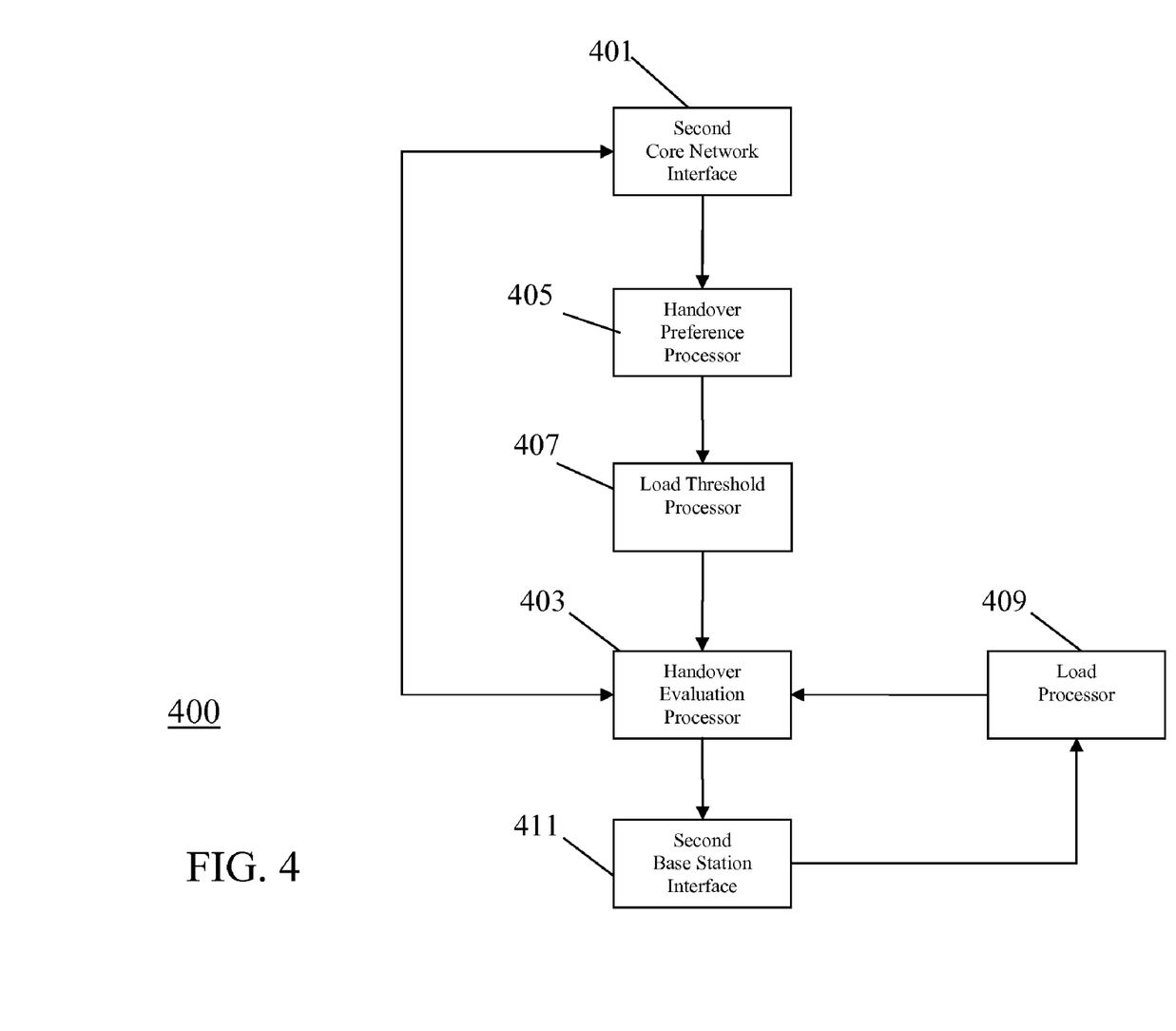
FIG. 4 illustrates an example of elements of a Radio Network Controller in accordance with some embodiments of the invention.

FIG. 4 illustrates an example of elements of the RNC 111.

The RNC 111 comprises a second core network interface 401 which is arranged to communicate with the CN 109. Specifically, the handover request message transmitted by the BSC 107 can be received by the second core network interface 401.

The second core network interface 401 is coupled to a handover evaluation processor 403 which is arranged to determine whether the handover request should be accepted or rejected.

The second core network interface 401 is furthermore coupled to a handover preference processor 405 which can receive a handover preference message and specifically can receive the Service Handover Information Element from the interlayer handover controller 121. Thus, the RNC 111 also receives an indication of the preferred access network for the first remote station 101.

The handover preference processor 405 is coupled to a load threshold processor 407 which is fed the information of the preferred RAN for the first remote station 101. The load threshold processor 407 is arranged to determine a load threshold below which incoming handovers are accepted and above which incoming handovers are rejected. The load threshold processor 407 determines this threshold depending on the access layer/RAN preference of the remote station being handed over. The load threshold processor 407 is coupled to the handover evaluation processor 403 which is fed the load threshold determined for the handover request.

The RNC 111 furthermore comprises a load processor 409 which is arranged to determine a load indication for the UMTS network. Specifically, the load processor 409 determines a current loading of the target cell for the handover request. The load processor 409 is coupled to a second base station interface 411 which is operable to communicate with base stations supported by the RNC 111 and specifically to communicate with the UMTS base station 113. The load processor 409 can thus receive load information from the UMTS base station 113, such as for example the interference measurements, and can determine a load measure based on these measurements.

The load processor 409 is furthermore coupled to the handover evaluation processor 403 which is fed the determined load indication. The handover evaluation processor 403 proceeds to determine whether to accept or reject the handover request by comparing the determined load indication with the handover load threshold determined by the load threshold processor 407.

Specifically, if the determined load for the target cell exceeds the handover load threshold determined for the communication service to be handed over, the handover evaluation processor 403 rejects the handover as it is not considered that there is sufficient resource available to support the call. However, if the determined load for the target cell is lower than the handover load threshold, the handover evaluation processor 403 accepts the handover.

If the handover is accepted the handover evaluation processor 403 generates a handover accept message and transmits this to the CN 109 and the GSM RAN thereby initiating the handover procedure. If the handover is not accepted the handover evaluation processor 403 generates a handover reject message and transmits this to the CN 109 and the GSM RAN thereby terminating the handover procedure.

In the system of FIG. 1, the decision of whether to accept or reject a handover request is thus based on a flexible evaluation of the load of the target cell as well as the access layer preference of the communication service being handed over. This allows improved handover performance and in particular can allow an increased number of communication services to be supported by the preferred RAN. In contrast to conventional systems, the RAN preference is thus not only used by the serving RAN to determine whether to initiate a handover attempt but is also used by the target RAN to determine whether this handover attempt should be accepted or rejected.

Specifically, the system can allow handovers to be accepted at higher load levels for communication services that have a preference for the target RAN than for communication services that do not have a specific preference for this RAN.

As a specific example, the load threshold processor 407 can evaluate the preference indication for the first remote station 101. If this indicates a preference for the communication service to be supported by UMTS, it may set the load threshold at a value which is higher than a nominal value. This will provide a higher probability that the handover is accepted and thus that the communication service is supported by the most preferred RAN.

Conversely, if the preference indication indicates that the communication service has a preference for GSM or does not have any specific preference, the load threshold can be set to a lower value (than a nominal value or the value used for a communication service having a preference for UMTS) thereby reducing the probability of the handover being accepted. This may reduce the number of communication services supported that do not have a specific preference for the UMTS RAN and may therefore provide additional resource for support of communication services that have a preference for UMTS.

It will be appreciated that by controlling the threshold values and the relationship between the preference indication and the load thresholds, a more flexible and improved resource management can be achieved and especially when the loading approaches saturation.

In some embodiments, a preference indication may be received for all communication services and all remote stations prior to (or in association with) any handover request. However, in some embodiments a handover preference message is only received for some remote stations or communication services. In such cases, the load threshold processor 407 can simply set the load threshold to a predetermined value. For example, a nominal value may be specified for all communication services and another load threshold is only generated if an explicit handover preference message is received.

It will be appreciated that the handover preference message can be transmitted to the target RAN (in the specific example the UMTS RAN) in connection with a handover request but that it in other embodiments may for example be transmitted independently of such a request. For example, the interlayer handover controller 121 may at regular intervals transmit information to the BSCs and RNCs of which promote stations have preference for which RANs.

It will also be appreciated that although the above description focused on a system wherein the handover preference indication was determined and communicated by the core network 109, this functionality may be located elsewhere in other embodiments.

Specifically, the handover preference message may be initiated by the handover requesting RAN and transmitted to the target RAN together with the handover request. For example, when a handover attempt is initiated the first handover controller 117 can include the preference indication in the handover request message before transmitting this to the RNC 111.

In some embodiments, the decision of whether to accept or reject the handover request can furthermore be made in response to subscription data for a user of the remote station being handed over. For example, the network operator may provide three tiers of subscription corresponding to a premium subscription, a nominal subscription, and a budget subscription. When a handover preference message is received by the RNC 111, this may furthermore comprise an indication of the subscription class associated with the remote station. This information can be passed to the load threshold processor 407 which may further modify the handover load threshold depending on the subscription class. Specifically, for a premium subscription a higher load threshold may be determined and for a budget subscription a lower load threshold may be determined than for a nominal subscription.

It will be appreciated that although the above description has focused on embodiments where the functionality for deciding upon handovers is located in a fixed RAN, the functionality may be located elsewhere in other embodiments.

For example, in some embodiments the remote stations can comprise functionality for deciding whether a handover should be performed. Specifically, a remote station can evaluate measurement reports from base stations of different radio networks and can therefrom evaluate if the handover should be performed. This determination can follow the principles described for the first handover controller 117 and the second handover controller 119. Specifically, the determination can be made in response to a handover preference indication received in a Service Handover Information Element sent to the remote station from the currently serving base station.

It will also be appreciated that although the above description has focused on handovers between a second generation cellular communication system RAN, in the form of a GSM RAN, and a third generation cellular communication system RAN, in the form of a UMTS RAN, the described principles can be applied to other radio networks and RANs.

Specifically, a radio network can be a Wireless Local Area Network (WLAN) such as IEEE 802.11x WLAN. In such a case, the core network can be a hybrid network comprising both core network elements of a cellular communication system as well as fixed network elements of the WLAN.

Similarly, although the above description has focused on handovers from a second generation cellular communication system RAN to a third generation cellular communication system RAN, the described principles can equally be applied to handovers from a third generation cellular communication system RAN to a second generation cellular communication system RAN.

In some embodiments, the handover controllers 117, 119 can estimate a handover preference that can be applied to a service if no explicit handover preference has been received for this. Thus, if no handover preference message has been received by the handover controllers 117, 119 for a specific service, the controllers 117, 119 can apply a nominal handover preference for the service. This nominal handover preference can be estimated in response to one or more characteristics of one or more of the radio bearers which are set up in support of the service. For example, if the service is currently supported by a UMTS RAN radio access bearer having a quality of service requirement that cannot easily be met by GSM, the second handover controller 119 may infer a preference for the UMTS RAN. However, if the parameters of the radio bearer are such that the quality of service requirements can easily be provided by GSM, the second handover controller 119 may infer a preference for a minimisation of handovers.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. A communication system comprising:
a first radio network supporting a first air interface and a second radio network supporting a second air interface; wherein the first radio network comprises: means for determining that a handover attempt to the second radio network should be attempted for a first remote station supported by the first radio network, transmitting means for transmitting, in response to the determining handover attempt to the second radio network should be attempted, a handover request message for the first remote station to the second radio network; and the second radio network comprises: means for receiving the handover request message, means for receiving a handover preference message for the first remote station, the handover preference message comprising a preference indication for a radio network, means for determining a load indication for the second radio network, threshold means for determining a handover load threshold for the first remote station in response to the preference indication, means for determining whether to accept a handover of the first remote station in response to a comparison of the load indication and the handover load threshold, wherein if it is determined based on the load indication that a load for the second radio network exceeds the handover load threshold, the handover is rejected by the second radio network.

2. The communication system of claim 1 wherein the preference indication comprises an indication of a preferred air interface.

3. The communication system of claim 1 wherein the threshold means is arranged to change the handover load threshold in response to the preference indication being indicative of a preference for the second network.

4. The communication system of claim 1 wherein the threshold means is further arranged to determine the handover load threshold in response to subscription data for a user of the first remote station.

5. The communication system of claim 1 wherein the any of the radio networks comprise means for setting the preference indication.

6. The communication system of claim 1 wherein the communication system further comprises a core network for routing data to and from radio networks and the transmitting means is arranged to transmit the handover request message to the second radio network via the core network.

7. The communication system of claim 1 wherein the second radio network is a different Radio Access Network than the first radio network.

8. The communication system of claim 1 wherein the threshold means is arranged to set the handover load threshold to a predetermined value if no handover preference message is received for the first remote station.

9. The communication system of claim 1 wherein possible values of the preference indication comprises at least one value selected from the group of: a handover preference for the second radio network; a handover preference for the first radio network; and an indication that handover to the second radio network is not allowed.

10. A method of operation in a communication system including a first radio network supporting a first air interface and a second radio network supporting a second air interface; the method comprising: the first radio network performing determining that a handover attempt to the second radio network should be attempted for a first remote station supported by the first radio network, and transmitting, in response to the determining handover attempt to the second radio network should be attempted, a handover request message for the first remote station to the second radio network; and the second radio network performing receiving the handover request message, receiving a handover preference message for the first remote station, the handover preference message comprising a preference indication for a radio network, determining a load indication for the second radio network; determining a handover load threshold for the first remote station in response to the preference indication, and determining whether to accept a handover of the first remote station in response to a comparison of the load indication and the handover load threshold, wherein if it is determined based on the load indication that a load for the second radio network exceeds the handover load threshold, the handover is rejected by the second radio network.

11. The method of claim 10, wherein the determining a handover load threshold comprises changing the handover load threshold in response to the preference indication being indicative of a preference for the second network.

12. The method of claim 10, wherein the determining a handover load threshold comprises determining the handover load threshold in response to subscription data for a user of the first remote station.

13. The method of claim 10, further comprises routing data to and from radio networks via a core networks; and the transmitting comprises transmitting the handover request message to the second radio network via the core network.

14. The method of claim 10, wherein the determining a handover load threshold comprises setting the handover load threshold to a predetermined value if no handover preference message is received for the first remote station.

* * * * *

UNITED STATES PATENT AND TRADEMARK OFFICE
CERTIFICATE OF CORRECTION

| | | |
|---|---|---|
| PATENT NO. | : 8,027,683 B2 | Page 1 of 1 |
| APPLICATION NO. | : 12/297083 | |
| DATED | : September 27, 2011 | |
| INVENTOR(S) | : Thomas | |

It is certified that error appears in the above-identified patent and that said Letters Patent is hereby corrected as shown below:

Title Page, Item (56), under "U.S. PATENT DOCUMENTS", in Column 2, Line 5, delete "Lahtinen et al." and insert -- Einola et al. --, therefor.

In the Drawings

In Fig. 1, Sheet 1 of 4, for Tag "109", Line 1, delete "Corc" and insert -- Core --, therefor.

Signed and Sealed this
Twenty-fifth Day of December, 2012

David J. Kappos
*Director of the United States Patent and Trademark Office*